May 14, 1929.  C. J. W. CLASEN  1,712,744
RAILWAY CAR TRUCK
Original Filed Nov. 18, 1927   3 Sheets-Sheet 2
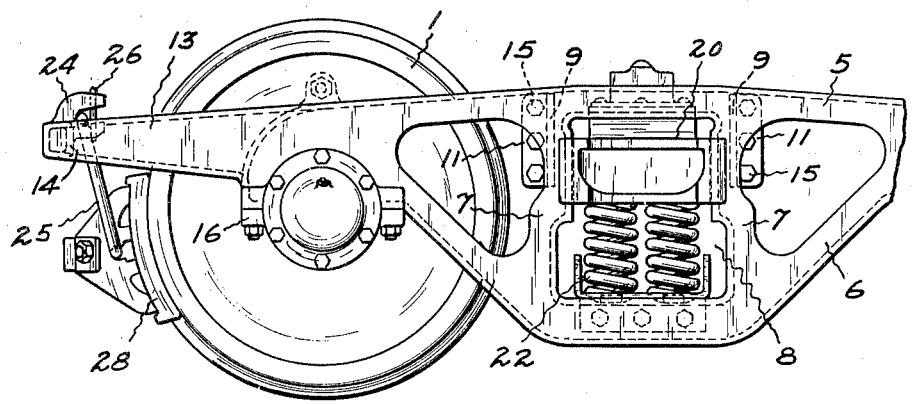
Fig. 2.
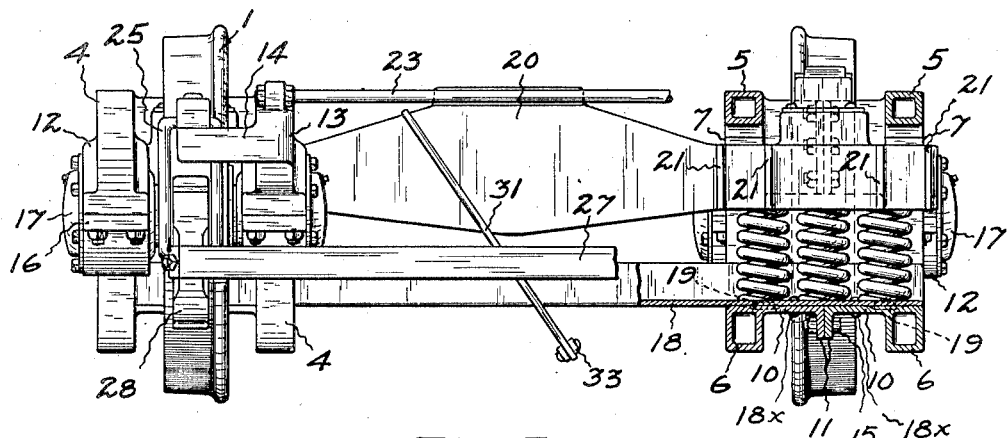
Fig. 3.
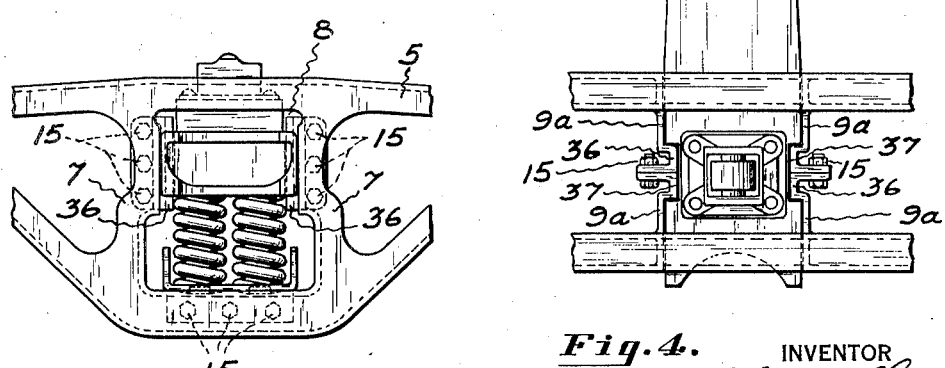
Fig. 5.
Fig. 4.
INVENTOR
C. J. W. Clasen
BY
Evans & McCoy
ATTORNEYS May 14, 1929.  C. J. W. CLASEN  1,712,744
RAILWAY CAR TRUCK
Original Filed Nov. 18, 1927   3 Sheets-Sheet 3
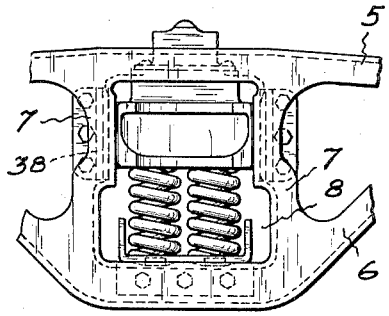
Fig.6.
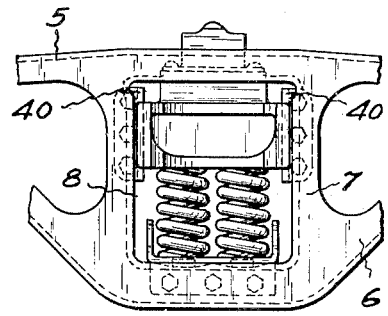
Fig.8.
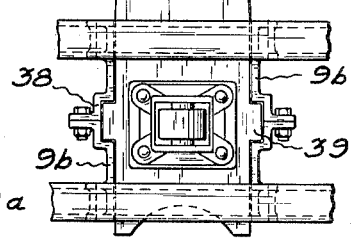
Fig.7.
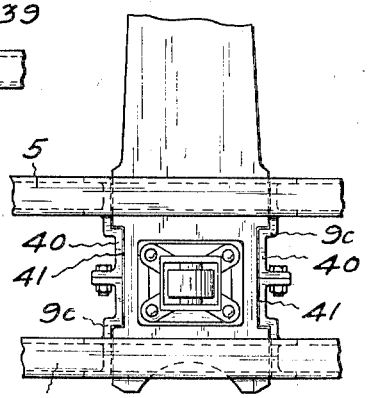
Fig.9.
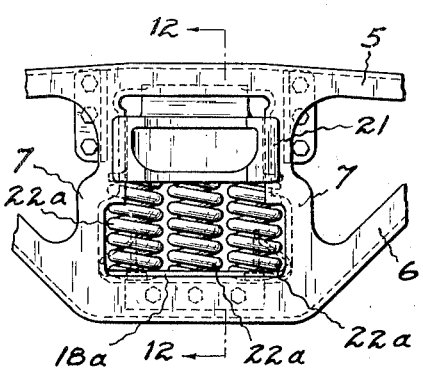
Fig.10
Fig.11.
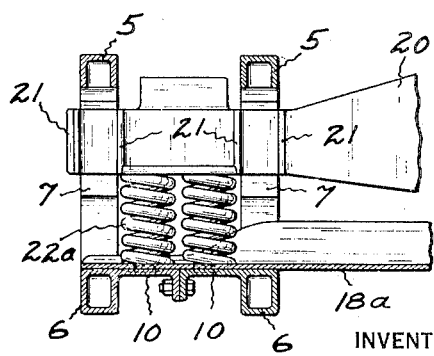
Fig.12.
INVENTOR
C. J. W. Clasen
BY
Evans E. McCoy
ATTORNEYS Patented May 14, 1929.

1,712,744

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed November 18, 1927, Serial No. 234,137. Renewed March 7, 1929.

This invention relates to railway car trucks and while the invention is of quite general application, the particular truck herein disclosed is particularly designed for railway freight cars.

The invention has for its object to provide a truck having independently mounted wheels in which the frame is of simple construction possessing the requisite strength and durability and composed of a minimum number of parts.

Further objects are to provide a truck of the character above referred to in which the main frame members are identical in form and interchangeable; to provide a truck in which the brakes are readily accessible for repair or replacement and to provide a truck in which the individual wheels with their axles are readily removable.

A further object is to provide a truck frame possessing great strength, but of relatively light weight and further to provide a truck in which each pair of frame members are provided with means by which they may be rigidly united to provide a unitary structure.

A further object is to provide a truck frame in which the longitudinal frame members are so constructed and arranged as to provide certain of the frame members with projecting ends for supporting brake beams at opposite ends of the frame in advance of the front wheels and to the rear of the rear wheels.

With the above and other objects in view, the invention may be said to comprise the structure as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 2 is a fragmentary side elevation of the truck.

Fig. 3 is an end elevation of the truck with a portion thereof shown in section on the line indicated at 3—3 in Fig. 1.

Fig. 4 is a fragmentary top plan view showing a modified form of bolster supporting and guiding means.

Fig. 5 is a side elevation of the structure shown in Fig. 4.

Figs. 6 and 7 are views similar to Fig. 5 and Fig. 4 respectively, showing a further modification of the bolster supporting and guiding means.

Figs. 8 and 9 are views showing, in side elevation and top plan, respectively, a further modification of the bolster guiding and supporting structure.

Figs. 10, 11 and 12 show a further modification of the bolster supporting means, Fig. 10 being a top plan view, Fig. 11 a side elevation and Fig. 12 a section on the line indicated at 12—12 in Fig. 11.

Figure 1:
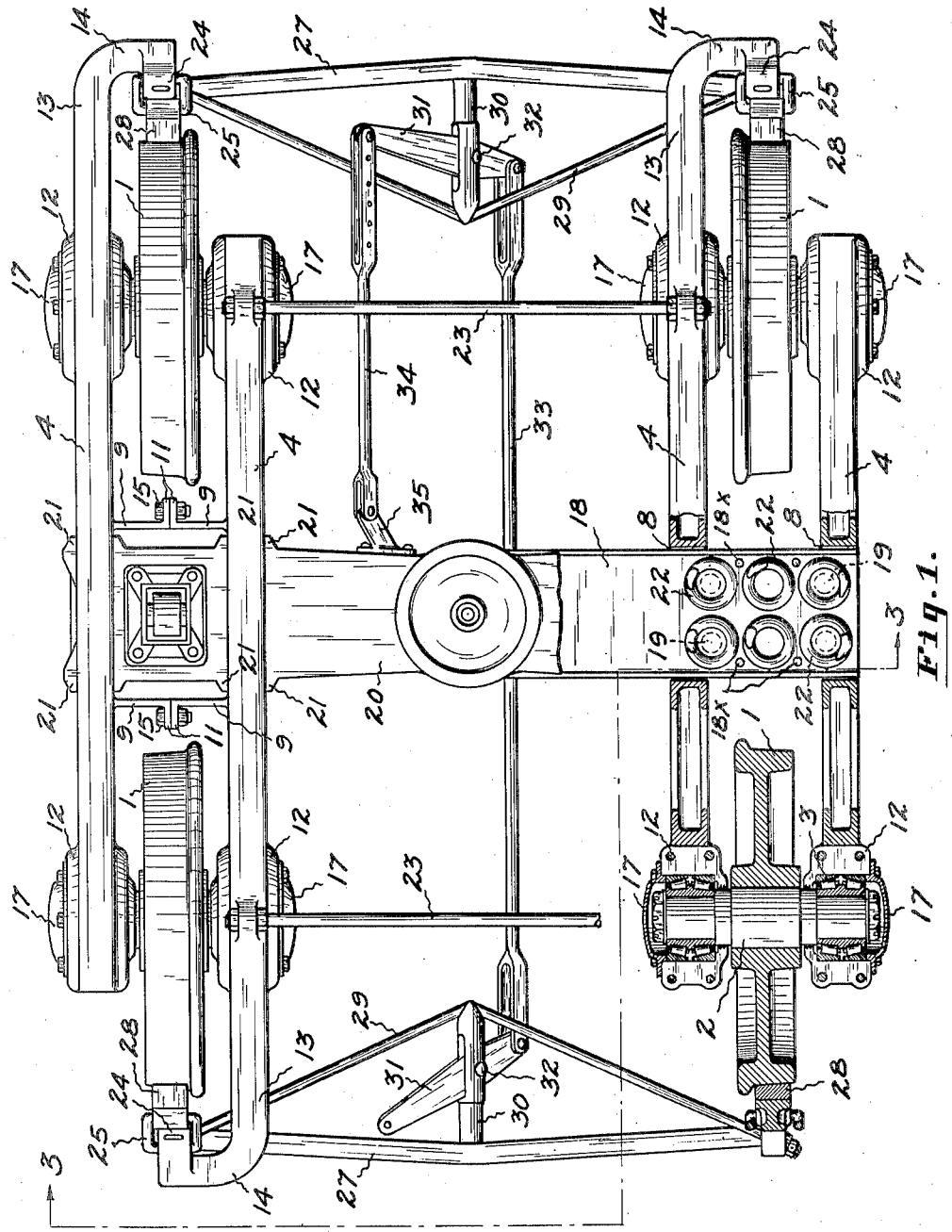
Figure 1 is a top plan view of the truck with the frame broken away at one corner to show the bearings for one of the wheels.

Referring to the accompanying drawings, the supporting wheels which are the flanged car wheels are indicated by the numeral 1 and each of these wheels is provided with an individual axle 2, which projects upon opposite sides of the wheel, each axle being journaled at its opposite ends in any suitable encircling bearings, such as roller thrust bearings 3 mounted in longitudinal frame members 4, which are arranged in pairs at opposite sides of the truck, the frame members of each pair being on opposite sides of front and rear supporting wheels.

Each of the frame members 4 has an arched top chord 5, a truss shaped bottom chord 6 and substantially vertical columns 7 connecting the top and bottom chords, the columns 7 being spaced apart to provide a substantially rectangular bolster receiving opening 8, the lower portion of which is somewhat wider than the upper portion to permit the insertion and removal of the bolster. The frame members 4 are preferably castings of identical shape in cross section and each has integral flanges or webs 9 extending laterally from the upper portions of the columns 7 at opposite sides of the bolster receiving opening and integral flanges or webs 10 extending laterally from the bottom chord 5 at the bottom of the opening. The flanges or webs 9 and 10 provide means for rigidly uniting the frame members of each pair and are provided with attaching flanges 11 at their outer edges. While the frame members herein shown are U-shaped in section, it is obvious that the frame members may be L-shaped or T-shaped, if desired.

An important feature of the invention is the provision of a frame structure in which the longitudinal frame members at each side of the truck have end portions which are offset longitudinally with respect to each other so that at each corner of the truck, one of the longitudinal frame members projects past the other and terminates beyond the periphery of the adjacent supporting wheel to provide supports for brake beams in advance of the front wheels and to the rear of the rear wheels. Each of the frame members is provided with spaced bearing portions 12 to receive the bearings 3 and axles 2 and these bearing portions are so located in the frame members that each axle is mounted at one end in a bearing portion 12 at the end of one frame member of a pair and at the other in a bearing portion 12 in the other frame member which is spaced from the end thereof, the projecting end portion of the latter frame member forming an extension 13 which extends beyond the periphery of the wheel and has a laterally bent outer end 14 forming an attaching member or a brake beam support as will be hereinafter more fully explained. Either frame member may project beyond the other at the front or rear of the truck but, for convenience and economy of manufacture, it is preferred that the four frame members be in the form of identical and interchangeable castings each having a bearing portion at one end and a bearing portion spaced from the opposite end, the latter end portion of each frame member forming the brake supporting extension at each of the four corners of the truck.

In assembling the frame, the frame members 4 of each pair are reversely positioned with respect to each other with their bearing receiving portions and bolster receiving openings in alignment and with the attaching flanges 11 of one member in engagement with the attaching flanges of the other member, the two members being rigidly united by any suitable means, such as bolts or rivets 15 connecting the flanges 11. Each of the bearing receiving portions of the frame members consists of a semi-cylindrical recess formed in the under side of the member and a removable bearing retainer 16 adapted to be bolted to the member and to complete a cylindrical housing for the bearing. The outer race rings of the roller thrust bearing fit within the bearing receiving portions of the frame members and are held in place by means of retaining caps 17, bolted to the outer faces of the frame members.

The two pairs of frame members are rigidly connected by means of a channel shaped spring plank 18, which extends into the bolster receiving opening of the frame members at opposite sides of the truck and rests upon the bottom chord 6 and connecting webs 10 and is secured thereto by any suitable means, such as bolts or rivets 18$^x$. The spring plank 18 is interlocked with the frame members to provide a further rigid tie between opposite side portions of the frame members by means of lugs 19, integral with the connecting webs 10 and projecting into openings in the plank. A bolster 20 extends across the frame with its opposite ends slidable in the upper portions of the bolster receiving openings 8 of the frame members and this bolster may be yieldably supported for movement up and down in the frame members by means permitting a limited lateral movement with respect to the frame members or may be directly guided for vertical movement in the frame members. As herein shown, the bolster is provided with laterally projecting guide ribs 21 which overlie the inner and outer side faces of the columns 7 at the sides of the bolster receiving opening. The bolster rests on coil springs 22 which are interposed between the under side of the bolster and the portion of the spring plank. In addition to the spring plank 18, the two pairs of frame members 4 may be connected adjacent the front and rear wheel axles by transverse tie rods 23, which assist the spring plank in rigidly holding the two pairs of frame members in spaced relation.

The curved ends 14 of the extensions 13 of the frame members provide brake beam hanger supports 24 adapted to receive supporting links 25, which are retained in the supports 24 by means of pins 26 and which support at their lower ends transverse brake beams 27, which carry brake shoes 28 at their opposite ends for engagement with the front and rear wheels of the truck. Each of the brake beams is provided with a truss rod 29 which is attached at its opposite ends to the ends of the beams and extend at their centers over struts 30 rigidly attached to the beams. The struts 30 are slotted to receive actuating levers 31 which are connected intermediate their ends by pivots 32 to the struts. The lower ends of the levers 31 are connected by a link 33 and the upper end of one of the levers is connected by a link 34 to a bracket 35 attached to the bolster 20. The free upper end of the lever at the end of the truck opposite that at which the lever is connected to the bolster, may be connected by suitable links, cables or the like to the usual brake actuating mechanism of the car. The brake beams are so suspended that they normally hang in a position in which the brake shoes 28 are out of contact with the wheels, but upon actuation of the levers 31, the brake beams are pulled toward the wheels and the brake shoes brought in contact with the wheels with a pressure proportional to that applied through the actuating mechanism to the levers.

It will be apparent that a considerable saving in weight is affected by the longitudinally offset arrangement of the frame members by which one frame member only projects past each wheel. By suspending the brake beams at the front and rear ends of the truck, the brakes are made readily accessible for replacement or repair, the mounting of the brakes upon the truck frame is simplified and the wheel base may be shortened, if desired. However, if in any instance, it be desired to have the brake beams located between the wheels, this may be accomplished by constructing the truck of the present invention with a wheel base length sufficient to accommodate the brake beams in the central position.

By providing the integral connecting webs which rigidly join the frame members of each pair between the wheels, a rigid supporting structure is provided for the wheels, and the rigid spring plank serves to provide a strong tie between the opposite pairs of frames to hold them in spaced relation and transmit side thrusts to all of the frame members.

By reason of the removable bearing retaining members 16, any one of the wheels may be readily removed and replaced independently of the other wheels by simply jacking up one end of the truck. Furthermore, the identical construction of the four main frame members greatly reduces the cost of manufacture of the truck.

In Figs. 4 and 5 of the drawing, there is shown a modified construction in which the connecting webs 9ª are formed to provide a central channel shaped rib 36 projecting into the bolster receiving space and the bolster is provided with vertical grooves 37 in the opposite sides thereof which receive the inwardly projecting guide ribs 36.

In Figs. 6 and 7 of the drawings, the connecting webs 9ᵇ have their outer portions formed to provide centrally disposed vertical channels 38 and the bolster is provided with vertical ribs 39 which fit in the guide channels 38.

In Figs. 8 and 9 of the drawing, the connecting webs 9ᶜ are formed to provide wide guide ribs 40 and the bolster is provided with a groove 41 to receive the ribs 40.

In Figs. 10, 11 and 12 of the drawing, a modified form of spring support for the bolster is shown. In this modification, the spring plank 18ª is provided with widened end portions which extend the full width of the bottom portion of the bolster receiving opening 8 so that three transverse rows of supporting springs of standard dimensions may be interposed between the plank and bolster.

It will be apparent that the present invention provides a truck in which a very effective spring support for the bolster is provided, the plank extending beneath the bolster providing seats for rows of springs at each end and as shown in Figs. 10, 11 and 12, this plank and bolster may be widened at opposite ends to accommodate additional springs beneath the widened portion of the bolster so that, when desired, a large number of supporting springs may be employed.

It will further be apparent that the pairs of frame members rigidly connected together and to the spring plank provide a rugged construction which may be of relatively light weight.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A truck for railway cars having a pair of longitudinal frame members at each side thereof, supporting wheels mounted between the frame members of each pair and having separate axles, the frame members of each pair being offset longitudinally with respect to each other, one having a brake beam supporting portion in advance of the front wheel and the other a brake beam supporting portion to the rear of the rear wheel.

2. A truck for railway cars having a pair of identical longitudinal frame members at each side thereof, supporting wheels mounted between the frame members of each pair and having separate axles, the frame members of each pair being offset longitudinally with respect to the other, one having a laterally extending brake beam supporting portion at one end positioned in front of the front wheel and the other having a laterally extending brake beam supporting portion at the opposite end in the rear of the rear wheel.

3. A truck for railway cars having a pair of laterally spaced longitudinal frame members at each side thereof, supporting wheels mounted between the frame members of each pair and having separate axles, the frame members of each pair being offset longitudinally with respect to each other, one having a brake beam supporting portion in advance of the front wheel and the other a brake beam supporting portion to the rear of the rear wheel, and means for rigidly connecting the frame members.

4. A truck for railway cars having a pair of laterally spaced longitudinal frame members at each side thereof, supporting wheels mounted between the frame members of each pair and having separate axles, the frame members of each pair being offset longitudinally with respect to each other, one having a brake beam supporting portion in advance of the front wheel and the other a brake beam supporting portion to the rear of the rear wheel, means for rigidly connecting the frame members of each pair between the front and rear wheels, and means for rigidly connecting the pairs of frame members.

5. A truck for railway cars having a pair of longitudinal frame members at each side thereof, supporting wheels mounted between the frame members of each pair and having separate axles, the frame members of each pair being offset longitudinally with respect to each other, one having a brake beam supporting portion in advance of the front wheel and the other a brake beam supporting portion to the rear of the rear wheel, the frame members being in the form of substantially identical interchangeable castings.

6. A truck for railway cars having a pair of laterally spaced longitudinal frame members at each side thereof, supporting wheels mounted between the frame members of each pair and having separate axles, the frame members of each pair being offset longitudinally with respect to each other, one having a brake beam supporting portion in advance of the front wheel and the other a brake beam supporting portion to the rear of the rear wheel, means for rigidly connecting the frame members of each pair between the front and rear wheels, and means for rigidly connecting the pairs of frame members, comprising a rigid member extending transversely of the truck centrally thereof, and tie members connecting the inner frame members of the two pairs.

7. A truck for railway cars having a pair of longitudinal frame members at each side thereof, supporting wheels mounted between the frame members of each pair and having separate axles, the frame members of each pair having their ends offset longitudinally with respect to each other at each end of the truck, the projecting ends providing brake beam supporting means in advance of the front wheels and to the rear of the rear wheels, and means intermediate the front and rear wheels for rigidly connecting said frame members and for carrying the bolster springs.

8. In a truck for railway cars having independently mounted supporting wheels, a pair of laterally spaced longitudinal frame members disposed at each side thereof, supporting wheels mounted between each pair of frame members, each wheel having a separate axle, all four of said frame members being of substantially identical construction and each having at one end a brake beam supporting portion, the frame members of each pair being reversely positioned.

9. In a truck for railway cars having independently mounted supporting wheels, a pair of laterally spaced longitudinal frame members disposed at each side thereof between which the supporting wheels are mounted, all four of said frame members being of substantially identical construction and each being formed to receive a pair of axles and one end of each formed to provide a brake beam support, the frame members of each pair being reversely positioned.

10. A truck for railway cars having a pair of laterally spaced longitudinal frame members at each side thereof, each frame member having spaced bearing receiving portions, said frame members being substantially identical and each having a bolster receiving opening substantially midway between the bearing receiving portions thereof and each having integral laterally projecting flanges on opposite sides of its bolster receiving opening, the members of each pair being reversely arranged with their bolster and bearing receiving portions in alignment and with the flanges of adjacent members in engagement and rigidly secured together.

11. A truck for railway cars having a pair of laterally spaced longitudinal frame members at each side thereof, each frame member having spaced bearing receiving portions and a bolster receiving opening substantially midway between the bearing receiving portions thereof, each frame member having integral laterally projecting flanges on opposite sides of its bolster receiving opening, the members of each pair being arranged with their bolster and bearing receiving portions in alignment and with the flanges of adjacent members in engagement and rigidly secured together, said flanges being of a shape to provide bolster guides.

12. A truck for railway cars having a pair of laterally spaced longitudinal frame members at each side thereof, each frame member having spaced bearing receiving portions and a bolster receiving opening substantially midway between the bearing receiving portions thereof, each frame member having integral laterally projecting flanges on opposite sides of its bolster receiving opening, and along the bottom of the opening, the members of each pair being arranged with their bearing and bolster receiving portions in alignment and with their laterally projecting flanges abutting and rigidly secured together.

13. A truck for railway cars having a pair of laterally spaced longitudinal frame members at each side thereof, each frame member having spaced bearing receiving portions, said frame members being substantially identical and each having a bolster receiving opening substantially midway between the bearing receiving portions thereof and each having integral laterally projecting flanges on opposite sides of its bolster receiving opening, the members of each pair being reversely arranged with their bolster and bearing receiving portions in alignment and with the flanges of adjacent members in engagement and rigidly secured together, a bolster having its ends slidably mounted in said openings, a spring plank extending across the frame through said openings and secured to the frame members, and springs interposed between said plank and bolster.

14. A truck for railway cars having a pair of laterally spaced longitudinal frame members at each side thereof, each frame member having spaced bearing receiving portions, said frame members being substantially identical and each having a bolster receiving opening substantially midway between the bearing receiving portions thereof and each having integral laterally projecting flanges on opposite sides of its bolster receiving opening, and along the bottom of the opening, the members of each pair being reversely arranged with their bearing and bolster receiving portions in alignment and with their laterally projecting flanges abutting and rigidly secured together, a bolster having its ends extending into said openings and movable vertically therein, a spring plank having its ends resting upon and held against movement with respect to said bottom flanges, and springs interposed between said plank and bolster.

15. A truck for railway cars having a pair of laterally spaced longitudinal frame members at each side thereof, each frame member having spaced bearing receiving portions, one at an end thereof and the other spaced from the opposite end, each bearing receiving portion comprising a recess upon the under side of the frame member and a removable retaining member adapted to be attached to the under side of the frame member, each frame member being of greater depth between its bearing receiving portions and having a bolster receiving opening between said bearing portions, the extending end of each member having means for supporting a brake beam, the members of each pair being reversely arranged with the bearing portions thereof in alignment, wheels provided with individual axles mounted in said bearing portions of the frame members, means for rigidly connecting said frame members and a bolster yieldably supported in said openings.

16. A truck for railway cars having a pair of laterally spaced longitudinal frame members at each side thereof, each frame member having spaced bearing receiving portions, one at an end thereof and the other spaced from the opposite end, each bearing receiving portion comprising a recess upon the under side of the frame member and a removable retaining member adapted to be attached to the under side of the frame member, each frame member being of greater depth between its bearing receiving portions and having a bolster receiving opening between said bearing portions, the extending end of each member having means for supporting a brake beam, the members of each pair being reversely arranged with the bearing portions thereof in alignment, wheels provided with individual axles mounted in said bearing portions of the frame members, means for rigidly securing the frame members of each pair together, a spring plank extending through said openings and rigidly connecting said pairs of frame members, a bolster having its ends slidable in said openings, and bolster supporting springs interposed between said plank and bolster.

17. A truck for railway cars having a pair of laterally spaced longitudinal frame members at each side thereof, each frame member having spaced bearing receiving portions, one at an end thereof and the other spaced from the opposite end, each bearing receiving portion comprising a recess upon the under side of the frame member and a removable retaining member adapted to be attached to the under side of the frame member, each frame member being of greater depth between its bearing receiving portions and having a bolster receiving opening substantially midway between said bearing portions, the extending end of each member having means for supporting a brake beam, the members of each pair being reversely arranged with the bearing portions thereof in alignment, wheels provided with individual axles mounted in said bearing portions of the frame members, means for rigidly securing the frame members of each pair together between the front and rear wheels, means for rigidly connecting the two pairs of frame members, a bolster having its ends slidable in said openings, and means for yieldably supporting said bolster.

18. A truck for railway cars having a pair of laterally spaced longitudinal frame members at each side thereof, the four frame members being substantially identical castings of truss form, each casting having a bearing receiving portion at one end and a similar bearing receiving portion spaced from the opposite end thereof, a lateral extension forming a brake beam support at the latter end and a substantially rectangular bolster receiving opening midway between the bearing receiving portions, each casting having integral web like lateral extensions on one side along the sides and bottom of said opening, the frame members of each pair being reversely arranged with their bolster and bearing portions in alignment and with their lateral extensions abutting and rigidly secured together and with their lateral end extensions oppositely disposed, and wheels having individual axles mounted in said bearing receiving portions of the frame.

19. A truck frame member having an upper chord, a lower chord of truss form, spaced columns joining said chords and forming the sides of a bolster receiving opening, integral laterally projecting webs along the sides and bottom of the opening, said member having a bearing receiving portion adjacent each end of the lower chord, one of said bearing portions being at an end of the member and said member having a portion projecting beyond the other bearing portion and bent laterally to provide a brake beam support.

20. A truck for railway cars having a pair of laterally spaced longitudinal frame members at each side thereof, a front supporting wheel and a rear supporting wheel between the frame members of each pair, each wheel having a separate axle extending across the space between adjacent frame members and mounted therein, one of said frame members projecting past the end of the adjacent frame member at each corner of the truck, the ends of the projecting members at the front and rear of the truck being in advance of the front wheels and to the rear of the rear wheels.

21. A truck for railway cars having a pair of laterally spaced longitudinal frame members at each side thereof, a front supporting wheel and a rear supporting wheel between the frame members of each pair, each wheel having a separate axle extending across the space between adjacent frame members and mounted therein, one of said frame members projecting past the end of the adjacent frame member at each corner of the truck, the ends of the projecting members at the front and rear of the truck being in advance of the front wheels and to the rear of the rear wheels, and means for rigidly connecting the frame members.

In testimony whereof I affix my signature.

CLAUS J. WERNER CLASEN.